US008762008B2

(12) United States Patent
Marchthaler et al.

(10) Patent No.: US 8,762,008 B2
(45) Date of Patent: Jun. 24, 2014

(54) DEVICE HAVING PYROTECHNICALLY ADJUSTABLE RIGIDITY FOR ABSORBING CRASH ENERGY AND METHOD FOR ADJUSTING THE RIGIDITY

(75) Inventors: Reiner Marchthaler, Gingen (DE); Thomas Friedrich, Freiberg (DE); Achim Moritz, Winnenden (DE)

(73) Assignee: Robert Bosch GmbH, Stuttgart (DE)

( * ) Notice: Subject to any disclaimer, the term of this patent is extended or adjusted under 35 U.S.C. 154(b) by 234 days.

(21) Appl. No.: 13/454,885

(22) Filed: Apr. 24, 2012

(65) Prior Publication Data

US 2012/0283917 A1    Nov. 8, 2012

(30) Foreign Application Priority Data

May 5, 2011    (DE) .......................... 10 2011 075 288

(51) Int. Cl.
*B60R 22/00*    (2006.01)
(52) U.S. Cl.
USPC ....................................... 701/46; 296/187.03
(58) Field of Classification Search
USPC ........................... 701/46; 296/187.03, 203.01
See application file for complete search history.

(56) References Cited

U.S. PATENT DOCUMENTS 7,614,683 B2 * 11/2009 Roccato et al. .......... 296/187.03

FOREIGN PATENT DOCUMENTS

EP    1 792 786    6/2007

* cited by examiner

*Primary Examiner* — Thomas Black
*Assistant Examiner* — Luke Huynh
(74) *Attorney, Agent, or Firm* — Kenyon & Kenyon LLP

(57) ABSTRACT

A device having an adjustable rigidity for absorbing crash energy, includes: a housing for accommodating and deforming a deformation element when the deformation element is moved in a forward motion direction due to the crash energy; a disengageable die situated in the housing for accommodating and deforming the deformation element; a supporting device situated in the housing and configured to support, in a first position, the disengageable die against a radial force of the deformation element acting in a transverse direction to the forward motion direction, and (ii) release, in a second position, the disengageable die for a motion for disengagement due to the radial force; and a pyrotechnic actuator moving the supporting device from the first position into the second position, to adjust the rigidity of the device.

10 Claims, 6 Drawing Sheets

DEVICE HAVING PYROTECHNICALLY ADJUSTABLE RIGIDITY FOR ABSORBING CRASH ENERGY AND METHOD FOR ADJUSTING THE RIGIDITY

BACKGROUND OF THE INVENTION

1. Field of the Invention

The present invention relates to a device in a vehicle which has pyrotechnically adjustable rigidity for absorbing crash energy, and also relates to a method for adjusting the rigidity of such a device.

2. Description of the Related Art

Published European patent application document EP 1 792 786 A2 shows a crash box for the integration of a bumper cross member and a frame side member of a motor vehicle. The crash box has a housing-like deformation profile as a folding construction made of sheet metal and a flange plate on the side of the frame side member.

BRIEF SUMMARY OF THE INVENTION

With this as background, the present invention provides a device having adjustable rigidity as well as a method for setting the rigidity according to the main claims.

An adaptive crash structure may work based on a tapered absorber. The tapering diameter may be varied by the effective engagement and disengagement of die plates, and the rigidity of the crash structure may thus be adjusted.

The present invention is based on the knowledge that, using an actuator system based on pyrotechnics, one is able to implement an especially short adjustment time for moving a supporting device of a breakable die of an adaptive crash structure into a position in which the breakable die is released so as to disengage.

Since, in order to implement the principle provided in this instance, a particularly small pressure volume is especially advantageous for a suitable and rapidly effective actuator system, the advantage of saving installation space comes about in a device produced according to the approach provided in this context. This, in combination with a low required weight of the supporting device and a rapid response time of the pyrotechnic actuator system makes a very low adjustment time possible. An additional installation space advantage of the whole adaptive structure comes about in that the supporting device may be executed having a small width, so that the outer diameter of a device made according to the approach provided in this instance is able to turn out to be clearly smaller. Corresponding implemented pyrotechnical actuators are able to be executed very small and compact, and simply integrated into the adaptive crash structure.

An additional advantage of the concept proposed in this instance is the possibility of a simple, and thus cost-effective, connection of a device proposed here to an air bag control unit of a vehicle. Since an air bag control unit usually already includes components for the ignition of a plurality of air bags, the degree of difficulty, and thus the additional cost factor, is slight of also triggering a pyrotechnical actuator of the adaptive crash structure in response to a crash.

The present invention creates a device having adjustable rigidity for absorbing impact energy using a housing for absorbing and deforming a deformation element, when the deformation element is moved in a forward motion direction caused by the impact energy, the device having the following features:

a disengageable die, arranged in the housing, for accommodating and deforming the deformation element;

a supporting device arranged in the housing, that is developed, in a first position, to support the disengageable die against a radial force of the deformation element acting in a transverse direction to the forward motion direction, and in a second position, to release the disengageable die for a disengagement motion because of the radial force; and a pyrotechnic actuator for generating a pressure for moving the supporting device from the first position into the second position, in order to set the rigidity of the device.

The device may be a tapering absorber, for example. The device may be used in a vehicle, for the absorption of crash energy due to the collision of the vehicle with an additional vehicle, for example, or with a stationary object, and acting upon the vehicle and its passengers. The device may be positioned in the front-end section or the rear-end section of the vehicle.

The housing may have an opening, for instance, via which, in the at-rest position of the device, an end section of the deformation element is accommodated at least partially in the housing, and may have an opposite, additional opening via which the deformation element is able to exit from the housing after a deformation process, based on a collision of the vehicle. The housing may be composed of two housing halves, for example, the one housing half having the opening for accommodating the deformation element and the other housing half having the additional opening for the exit of the deformation element from the housing. The housing may enclose the deformation element, or parts of same, in full circumference during the motion of the deformation element through the housing. The housing may be vaulted for the storage of the disengageable die and the actuator on the inside of the housing.

The deformation element may be developed as an elongated component in the form of a round or cornered tube, for example. In response to the collision, the deformation element may then be moved through the housing in the forward motion direction along its longitudinal axis, and in the process be accommodated by the disengageable die and deformed, so as to absorb the crash energy. The deformation of the deformation element may go ahead in the form of a tapering, that is, as reduction of the cross section of the deformation element by the disengageable die.

The disengageable die may be developed in one piece in the form of a round or cornered frame, whose unobstructed inner dimension is at least partially less than a cross section of the deformation element before entry into a deformation section of the disengageable die. The disengageable die may be formed in one piece or be made up of several individual parts that are not connected to one another or connected via predetermined breaking point locations. The inner side or sides of the disengageable die may run in a slanting manner, so that the disengageable die forms a sort of funnel, which leads to the tapering of the deformation element, while the latter moves along on the inside of the disengageable die because of the collision. The disengageable die may be positioned in the housing in such a way that an outer wall of the disengageable die is at a distance from an inner wall of the housing. The disengageable die is able to be varied in its position. In particular, when support by the supporting device is lacking, the disengageable die may be pushed away from the deformation element by the radial force of the penetrating deformation element, i.e. pressed towards the inner wall of the housing and perhaps broken, and thus not have the effect of any tapering of the deformation element.

The supporting device may be in one piece of several pieces, and may be positioned in the first position between the outer wall of the disengageable die and the inner wall of the housing. It may be formed of a material which has a sufficient rigidity so as, in the first position, to support the disengageable die in such a way against the radial force of the deformation element, moving along the inner side(s) of the disengageable die, that the deformation element is able to be tapered by the disengageable die. The supporting device may, for instance, be held fixed via a spring element in the first position or at rest.

The pyrotechnic actuator may be positioned in a hollow space in the housing that is formed by forward wall of the housing, in the forward motion direction, and the supporting device. The pyrotechnic actuator may be developed to generate a pressure wave, in response to a signal of a control unit of the device, that is sufficiently strong to move the supporting device, for instance, into the second position against a spring force, so as to release the disengageable die for disengaging through the deformation element. In that way, the rigidity of the device may be reduced accordingly.

According to one specific embodiment, the supporting device may be developed as a ring, particularly whose inner diameter is greater or equal to an outer circumference of the disengageable die. For example, in the first position the supporting device is able to surround the disengageable die in its full circumference in such a way that the outer side of the disengageable die borders on an inner surface of the ring-shaped supporting device. In such a way, advantageously, in the first position of the supporting device, a uniform support towards all sides of the disengageable die may be ensured, so that a deformation of the deformation element at a highly set rigidity of the device may take place optimally and at a maximum energy absorption.

According to a further specific embodiment, the pyrotechnic actuator may have a plurality of ignition elements arranged for generating pressure, particularly, having the ignition elements positioned equidistantly. The ignition elements or priming caps may be electrically ignitable explosion means which are able to be activated using a signal, for instance, from a control unit, especially an air bag control unit of a vehicle. In this instance, the priming caps may not be used to ignite an incendiary agent, but only to generate a pressure wave that is sufficient to "shoot" the supporting device from the first position into the second position. Two, three or four priming caps may be used, for example. This specific embodiment offers the advantage that, in such a way, using an ignition synchronous in time of all the priming caps, a homogeneous pressure buildup may be ensured, by which a twisting of the supporting device is able to be avoided during the motion from the first into the second position.

It is also favorable if a wall of the housing, that is positioned behind the supporting device in the forward motion direction, has at least one through opening. In that way, an air volume located behind the supporting device in the forward motion direction, in the first position of the supporting device, is able to be expelled in a simple manner from the housing, using the motion into the second position. This advantageously helps to avoid that the supporting device snaps back again into the first position, after an activation of the pyrotechnic actuator.

According to one specific embodiment, the device may include a guiding element for guiding the supporting device between the first position and the second position and/or for fixing the supporting device in the second position. In this context, the guidance element may have, in particular, a sidewall extending slantwise into the range of motion of the supporting device between the first position and the second position. Alternatively, the guiding element may, in particular, have at least one latch that is positioned between the first position and the second position, which extends into the range of motion of the supporting device. In a subsection, the guiding element may include an inner side of the housing wall that is adjacent to the outer side of the supporting device. The inner dimension that is getting smaller, or rather the sidewall projecting in a slanting manner into the range of motion of the supporting device may, for instance, be provided by an inner wall of the guidance that tapers in the shape of a funnel in the forward motion direction. In the alternative specific embodiment, the latch may be formed in an encircling manner on an inner wall of the guiding element. The latch may be developed to project into the inside of the guiding element in such a way that the supporting device is able to be moved beyond the latch, because of the pressure caused by the ignition of the actuator, and subsequently held by the latch and be thus prevented from returning again into the first position. Both specific embodiments are easily provided implementations of a secure holding device, so as to fix the supporting device in the second position after the activation of the pyrotechnic actuator. In this way it may be optimally ensured that, at low rigidity of the device, the disengageable die is able to be disengaged by the deformation element.

According to one specific embodiment, the device may also have a non-disengageable die for accommodating and deforming the deformation element. The non-disengageable die may be positioned ahead of the disengageable die, in the housing, in the forward motion direction. The fixed or non-disengageable die may be positioned for support having an outer wall lying against a sidewall of the pressure chamber in the housing. Furthermore, the fixed or non-disengageable die may be formed to be indestructible by the impact, that is, of a more robust material than the deformation element, so that the section of the deformation element that moves into the housing upon a crash, is able to be tapered when penetrating into this die. Such a specific embodiment of the present invention offers the advantage that a tapering of the deformation element is already being initiated, so that the first deformation of the deformation element is not taking place at the disengageable die.

The present invention also creates a method for setting a rigidity of a device according to one of the specific embodiments explained above, wherein the method has the following steps:

receiving a signal having information about the crash energy;

comparing a value of the signal to a threshold value; and providing an activation signal to the pyrotechnic actuator for moving the supporting device from the first position into the second position, in order to set the rigidity of the device to a lower level, the providing taking place when the step of comparing yields that the value has a predetermined ratio to the threshold value.

The method may be carried out, for example, in a control unit, particularly in a control unit that is responsible for the triggering of air bags in a vehicle. The control unit may be connected to the device explained above or integrated into it. Thus, according to one specific embodiment of the method, the step of providing may take place based on a signal of the control unit. This may be a signal for triggering the air bags of a vehicle, for example, into which the device is integrated, for example.

The control unit may be developed to carry out or implement the steps of the method according to the present invention in corresponding devices. By this embodiment variant of the present invention, in the form of a control unit, the object on which the present invention is based can also be attained quickly and efficiently.

In the case at hand, a control device is an electrical device which processes sensor signals and outputs control signals as a function thereof. The control unit may have an interface, which may be implementable as hardware and/or software. In a hardware design, the interfaces may, for example, be part of a so-called system ASIC that contains the most different functions of the airbag control device. However, it is also possible for the interfaces to be separate, integrated circuits or to be at least partially made up of discrete components. In a software design, the interfaces may be software modules which are present on a microcontroller in addition to other software modules, for example.

The control unit may, for instance, receive the information on the crash energy from a sensor, e.g. an acceleration sensor of the vehicle, which detects the severity, the position and the direction of an occurring impact on the vehicle. The step of comparing the crash energy to the threshold value may be carried out in the control unit using a suitable algorithm. From the falling below, or the exceeding of the threshold value one may draw a conclusion on the severity of the collision. If the comparison says that a collision of low severity is occurring, decreasing the rigidity of the device is available. Accordingly, an activation signal or an ignition signal may be provided by the control unit to the pyrotechnic actuator, via the vehicle bus, for example, so that the pyrotechnic actuator is able to catapult the supporting device in the forward motion direction from the first position into the second position, in order to lower the rigidity of the device. If, on the other hand, the comparison step says that the severity of the collision is great, the provision of an activating signal may be suppressed, so that the supporting device remains in the first position, and the device remains set to high rigidity, so that it is able to absorb a large measure of the crash energy.

A computer program product is also of advantage, having program code that may be stored on a machine-readable carrier such as a semiconductor memory, a hard-disk memory or an optical memory, which is used to implement the method according to one of the specific embodiments described above, when the program is executed on a signal processing system such as a computer or a corresponding unit.

DETAILED DESCRIPTION OF THE INVENTION

Figure 1:
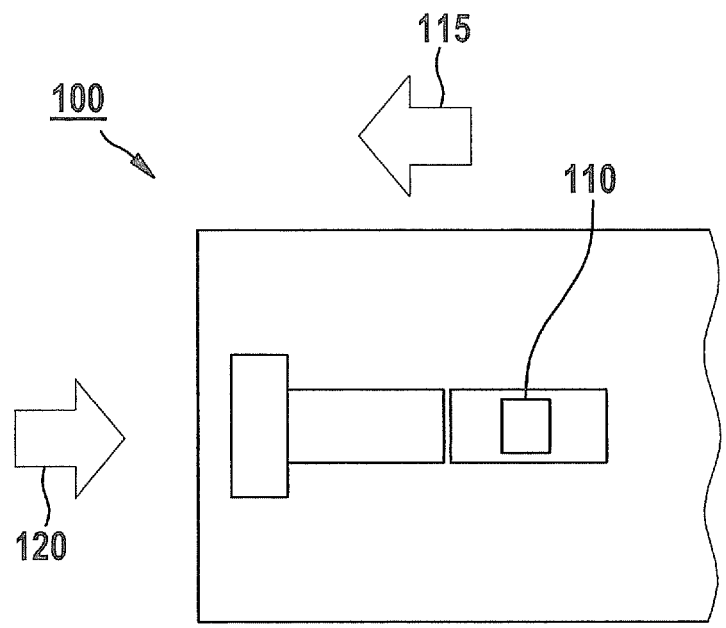
FIG. 1 shows a basic representation of a vehicle having an adaptive crash structure according to an exemplary embodiment of the present invention.

In the subsequent description of preferred exemplary embodiments of the present invention, the same or similar reference numerals are used for the various elements shown in the various figures and acting similarly, repeated description of these elements then being omitted.

An adaptive crash structure may be based on different principles. Thus, for example, an adaptive energy absorption of a crash structure may be implemented by the removal of rigidizing ribs by cutting work, or an adaptive energy absorption of a crash structure may be implemented by tapering. In order to set the rigidity, one may provide a rapid and accurate actuator systems for a crash structure that is modifiable in its rigidity, an eddy current actuator for an adaptive crash structure, an adaptive crash structure having a hydraulic ring or an adaptive crash structure which, under load, is able to reduce the force level, so as to make the acceleration pulse more harmonious for the passenger.

FIG. 1 shows a basic representation of a vehicle 100 having an adaptive crash structure 110 according to an exemplary embodiment of the present invention. A front-end structure of a vehicle is shown, which includes a cross member, and adjoining it, a front and a rear frame side member. Device 110 is integrated into the rear frame side member. Integration into the front frame side member is also possible. Moreover, crash structure 110 or an additional corresponding crash structure 110 may be implemented in addition or alternatively in the rear end of the vehicle. An arrow denotes the travel direction 115 of vehicle 100. A further arrow denotes a forward motion direction 120, in which, in case of a collision of vehicle 100, in this case in response to a frontal crash, the energy is to be absorbed, and in which, accordingly, a deformation element not shown in FIG. 1 of device 110 is moved in device 110, in order to absorb the crash energy by the deformation.

Figure 2A:
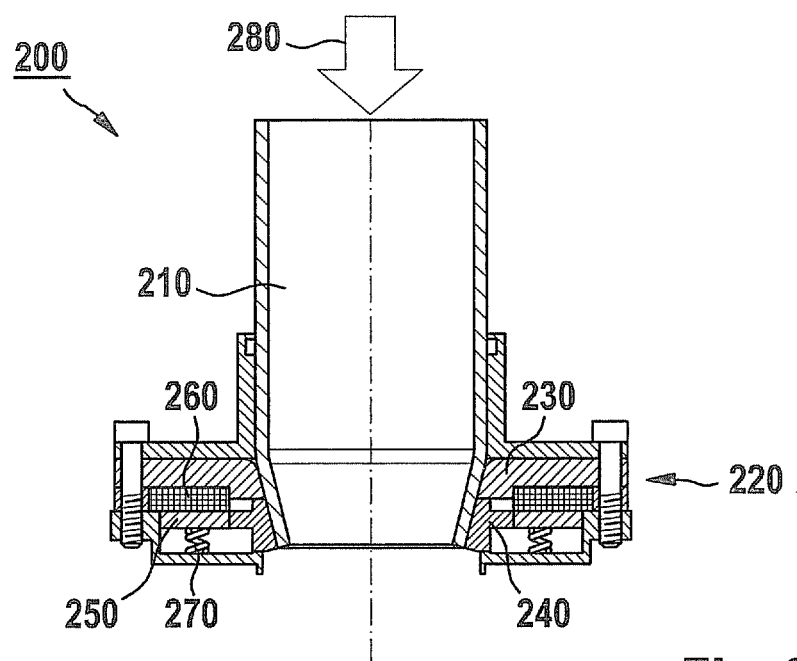
FIG. 2A shows a sectional image of an adaptive crash structure in a position at rest.
Figure 2B:
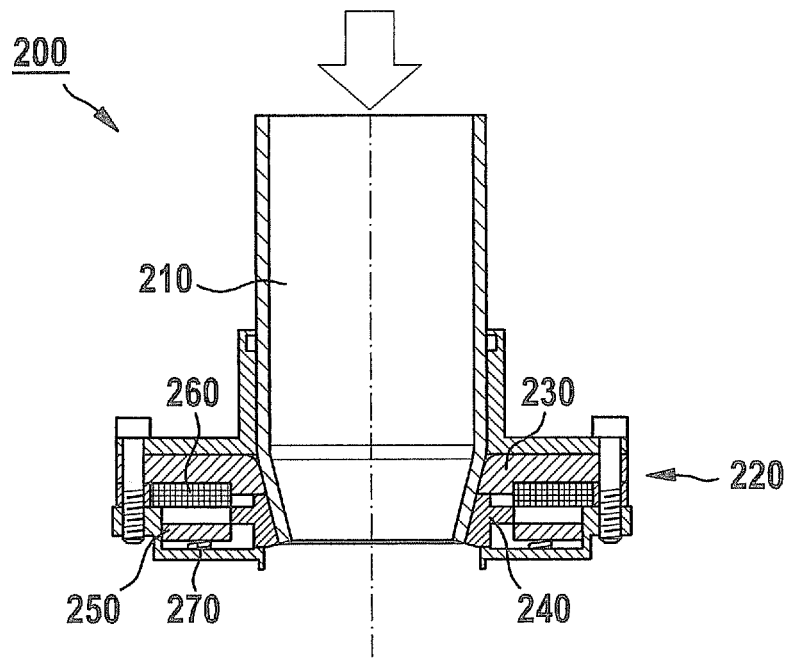
FIG. 2B shows a sectional image of the adaptive crash structure of FIG. 2A in an actuated position.
Figure 2C:
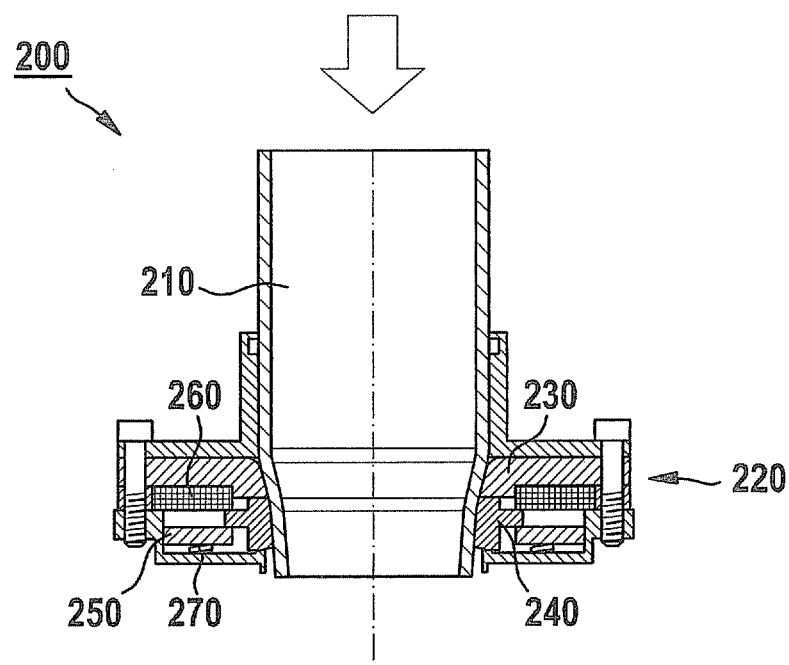
FIG. 2C shows a sectional image of the adaptive crash structure of FIG. 2A in case of a collision, having a soft setting.

A functioning of an adaptive crash structure or impact structure for protecting vehicle passengers in collisions is explained with the aid of FIGS. 2A, 2B and 2C. These structures are designed to replace parts of existing front vehicle structures in motor vehicles. In the basic setting, the structure is generally set to the greater rigidity, which corresponds to that of the front frame side member of the vehicle. The second setting, that is, the one to which one switches over, has a rigidity which corresponds to that of a usual crash box from the related art. It is also possible to install the adaptive crash structure further back in the front structure, that is, as substitute for the rear frame side member.

FIG. 2A shows a longitudinal section through an adjustable impact absorber 200, such as may be installed in the front section of a vehicle. Adaptive impact absorber 200 includes a deformation element 210, which is developed as a tube, in this case, as well as a housing 220, in which a fixed die 230 and a breakable die 240 are situated. In FIG. 2A an at-rest position of system 200 is shown. In this case, a ring 250, that is displaceable within the housing, is situated between breakable die 240 and a wall of housing 220, so that breakable die 240 is supported. This setting of system 200 is produced by a current flow through a coil 260 is interrupted, and a spring element 270 that is connected to the bottom of ring 250 exerts a force on ring 250, and holds it to the height of breakable die 240, so that it is able to support it. When there is a collision of the vehicle, in the basic setting of impact absorber 200, shown in FIG. 2A, tube 210 is pushed in an impact direction 280, shown with the aid of an arrow, along its longitudinal extension characterized by using a dot-dashed line, into fixed die 230 and into breakable die 240, and is sharply tapered in the process. Consequently, impact absorber 200 is set to a high or maximum rigidity in the at-rest position explained in FIG. 2A, and is able to absorb or remove a great quantity of impact energy.

In a further longitudinal representation, FIG. 2B shows adjustable impact absorber 200 in an actuated position. During the actuation, ring 250 is shifted. In this instance, a current flows through coil 260 and generates a magnetic field, by the use of which displaceable ring 250 is moved downwards, away from breakable die 240. Consequently, ring 250 no longer supports breakable die 240 against a radial force of tube 210 that is driving into die 240 in response to the impact. Now, if there is a collision, tube 210 also penetrates into fixed die 230 and into breakable die 240. Since ring 250 is not supporting breakable die 240, the latter is able to break and disengage as a result of the impression of a radial force by tube 210, for instance, at provided breaking point locations.

In a corresponding manner, FIG. 2C, in turn, shows impact absorber 200, in a longitudinal sectional representation, in the case of a collision, at a soft setting, or rather a low rigidity of absorber 200, as explained with the aid of the representation in FIG. 2B. In this case, breakable die 240 is broken and brought to disengagement by the radial force of tube 210 that is being pushed into housing 220. The degree of tapering of tube 210 during, or rather after the collision is thus less, compared to the basic setting sketched in FIG. 2A, and correspondingly less impact energy has been absorbed.

It may easily be seen, based on the illustrations of FIGS. 2A, 2B and 2C that, in the case of high impact speeds, and thus, high collision energy, it is advantageous to achieve a high energy absorption level early, which is why the higher rigidity should be set, as is shown by the illustration in FIG. 2A. In the case of low collision energies, a lower rigidity is required, so that structure 200 is able to be deformed by the lower force introduced. This principle is clarified with the aid of the illustrations in FIGS. 2B and 2C. This yields advantages in passenger stress, in the form of a stress that is less in intensity, but lasts longer.

The high and low levels of rigidity shown in the figures are set with the aid of an actuator, in the specific embodiments shown.

In the following, instead of the coil that shifts the ring, an alternative in the form of a pyrotechnic actuator is introduced. It is developed, for example, to move a supporting device for a disengageable die, such as a retainer ring, against a spring force. The principle of the shifting of the supporting device from the first into the second position using a pyrotechnically generated pressure wave, proposed herein, is introduced with the aid of the following figures. Pyrotechnic actuators are known, among other things, for use in triggering air bags. In the case of air bags, two essential elements are frequently present in the pyrotechnic module. First, there is the priming cap, which obtains a current pulse of the order of magnitude of 1-2 A from the air bag control unit, and ignites. Secondly, there is the gas generator or propelling charge, which burns off rapidly based on the initial ignition of the priming cap, which may also be perceived as an explosion. The gas caused by this burning off of the propelling charge fills the air bags within milliseconds. The size of the propelling charge has to be adapted to the size of the air bags. A two-step air bag includes both two priming caps and two propelling charges of different sizes, which are ignited sequentially.

Figure 3A:
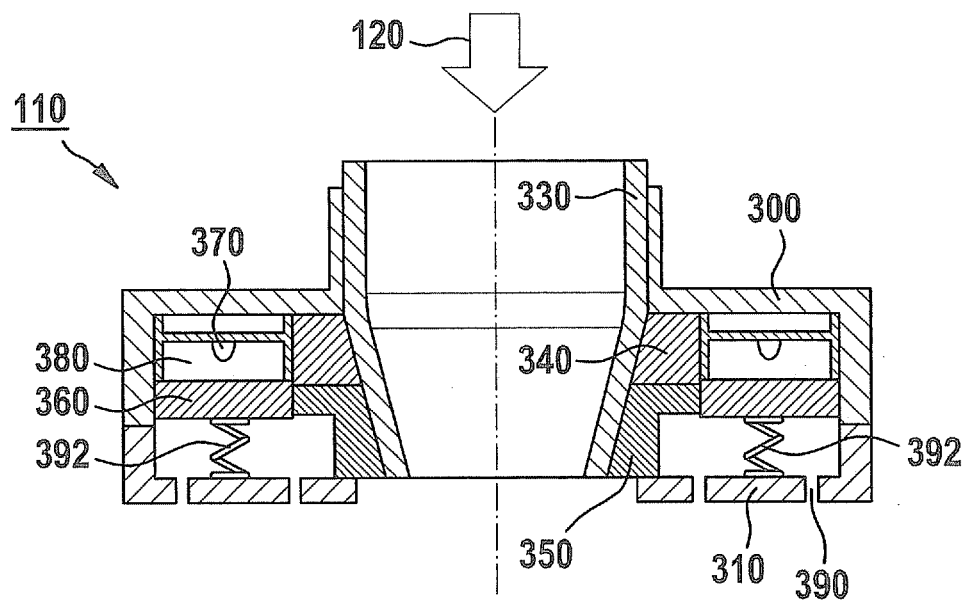
FIG. 3A shows a sectional image of an adaptive crash structure having a pyrotechnic actuator according to an exemplary embodiment of the present invention in a position at rest.

FIG. 3A shows a sectional image of adaptive crash structure 110 from FIG. 1, according to one exemplary embodiment of the present invention. The sectional image shows a left and a right side of device 110 in longitudinal section, which are situated as mirror images to each other with respect to a longitudinal axis of device 110 that is characterized by a dashed-dotted line.

FIG. 3A shows a crash structure 110 in an at-rest position, in which the high rigidity is set. What is shown is a housing which is composed of a first housing half 300 and a second housing half 301, and a deformation element 330, which is developed in this case as a tube, and whose end region is accommodated in housing 300, 310. In housing 300, 310, a non-disengageable die or primary die 340, a disengageable die 350, a supporting device 360, held in position by a spring, and a pyrotechnic actuator 370 are situated. In the exemplary embodiment shown in FIG. 3A, supporting device 360 is developed as a ring, and pyrotechnic actuator 370 is designed as two diametrally situated priming caps. Alternatively, only one priming cap or a plurality of priming caps may be used. As shown in the illustration in FIG. 3A, priming caps 370 are situated in a pressure chamber 380 that is closed in a gastight manner, which is limited or bordered by first housing half 300, primary die 340 and supporting device 360. Second housing half 310 has two through openings or exit holes 390. An arrow marks forward motion direction 120, in which, in the case of a collision, deformation element 330 is pushed into housing 300, 310 and is thereby deformed.

In the illustration in FIG. 3A, pyrotechnic actuator 370 is in the at-rest position. Supporting position 360 is held in the first position, using a spring force which is afforded by two spring elements 392 that are situated between supporting device 360 and second housing half 310, in which position it supports disengageable die 350 against a radial force of the deformation element that is being driven into housing 300, 310 during a collision. Thus, according to the illustration in FIG. 3A, the high rigidity of device 110 is set. Instead of the two spring elements 392, more or fewer spring elements may be used, or a one-piece spring in the form of a ring.

Figure 3B:
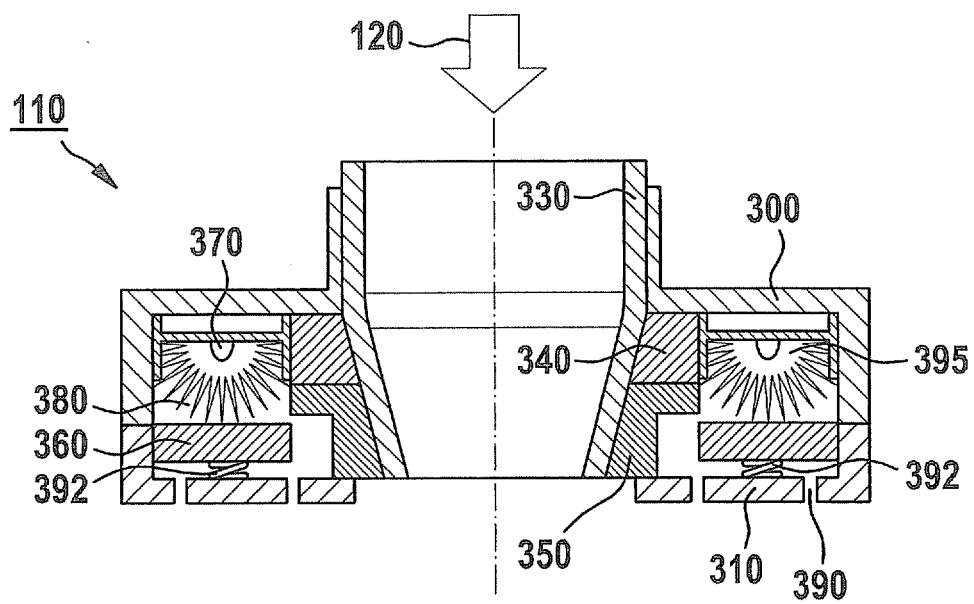
FIG. 3B shows a sectional image of the adaptive crash structure having a pyrotechnic actuator of FIG. 3A in an actuated position.

In another sectional illustration, FIG. 3B shows the device of FIG. 3A in the case of the activation or ignition of the pyrotechnic actuator in the form of priming caps 370. An explosion 395 takes place in response to the ignition of priming caps 370. A pressure wave formed as a result of explosion 395 expands to the entire volume of pressure chamber 380, so that sufficient pressure is built up to catapult ring 360 against the spring force of spring elements 392 into the second position shown in FIG. 3B, in which it releases disengageable die 350 to disengage and break.

In the illustration in FIG. 3A, actuator 370 of adaptive crash structure 110 is in the at-rest position. The maximum degree of deformation is set, that is, the rigidity of device 110 is at a maximum. After the detection of a crash, at which the rigidity is to be set lower, priming cap 370 is ignited, for instance, by the air bag control unit, and ring 360 is shot away as a result of the arising pressure wave, as is shown in the representation in FIG. 3B. Exit holes 390, which are implemented in the exemplary embodiment shown in FIGS. 3A and 3B, are provided so that no counterpressure builds up on the opposite side of ring 360. For, this could influence the dynamics of ring 360 in a negative manner, and could thus effect a malfunction of adaptive crash structure 110. One should also take care that no water is able to reach into the inner life of device 110 through these holes 390, in order to avoid a possible result of corroded surfaces, which would restrict the manner of functioning. According to one exemplary embodiment that is alternative and not shown in the figures, one could also do without exit holes 390. If there were a faulty triggering in the ignition of priming caps 370, ring 360 would be moved back again into the first position, using the spring force of spring elements 392, and the rigidity of device 110 would be at the high level again. A faulty triggering may be based, for instance, on the misinterpretation of an impact in progress, which may, for instance, only be a slight collision instead of a triggering-relevant crash. Since no deformation of deformation element 330 takes place in such a case, disengageable die 350 does not disengage, and ring 360 is simply able to return to the first position. In this way, a driver having a vehicle that has device 110, is able to drive, for example, to the nearest repair shop when having a crash structure 110 set to the high rigidity, and thus having maximum protection by crash structure 110.

In adaptive crash structure 110 shown in FIGS. 3A and 3B, since ring 360 is moved by only a few millimeters, and thus only an extremely small volume is created, a propelling charge or a gas generator is not required for the functionality of device 110. The energy of one priming cap, in this case of priming caps 370, is sufficient to displace ring 360, which is explained again below, with the aid of FIG. 8. Since ring 360 may have an unfavorable guidance ratio, in that its diameter is considerably greater than its length, it is important to take care that there is a homogeneous pressure buildup. Thus it may be avoided that the ring jams and is not able to travel the full path. For this reason, it is advantageous to use a plurality of priming caps 370. Correspondingly, the exemplary embodiment, explained with the aid of FIGS. 3A and 3B, of device 110 has, for instance, two priming caps 370, that are situated 180° apart with respect to ring 360. Alternatively, one might also conceivably use three priming caps 370 at 120° apart or four priming caps 370 at 90° apart.

The actuator principle shown by FIGS. 3A and 3B may be applied to other effective principles of energy absorption, such as opening out, turning upside down, folding, cutting, etc. The cross section of the tube 330 was sketched to be round in the specific embodiment shown here, but other cross sections are possible too, such as rectangular, square, oval, etc.

The use of adaptive crash structure 110, which was explained with the aid of FIGS. 3A and 3B, having pyrotechnic actuator system 370, is advantageous in the rear region of the vehicle front end structure, for instance, as a part of the rear frame side member. In severe crashes, since this part is deformed relatively late after the beginning of the collision, after ca. 30-40 ms, and the air bags have already been ignited, an irreversible rigidity adjustment as described here is in no way critical. In the case of the use of this invention in the front region of the vehicle's front end structure, for instance, as a part of the crash box and possibly of the front frame side member, irreversible triggering is a little more critical. Since these elements are deformed early in the crash event, that is, after fewer than 10 ms, a possible actuation has to take place even earlier. Until then, under certain circumstances, it cannot be clarified without a doubt whether, at this early point in time, the measured severity of the crash actually corresponds to the true severity of the crash. An increase in triggering certainty may be achieved by additional sensors, such as radar, lidar, video, ultrasonic sensors, etc. One additional advantage of the present invention is the simple, and thus cost-effective, connection to an air bag control unit. Since the air bag control unit already includes the components for the ignition of several air bags, the degree of difficulty, and consequently the additional cost factor of also triggering priming caps 370 of adaptive crash structure 110, when there is a crash, is slight.

It may be seen from the design of device 110, shown in FIGS. 3A and 3B, that the volume of pressure chamber 380, when the ring or supporting device 360 is in the at-rest position, is less than a volume of 3.5 cm$^3$. The result is that the initial peak in the pressure curve will amount to more than ca. 30 bar, which is a very great advantage. This, in combination with the small ring weight and the rapid response time of the priming cap, makes possible a very rapid adjustment time. Also of advantage is the installation space of entire adaptive structure 110. Ring 360 does not have to be wide as in the device shown in FIGS. 2A through 2C, but, owing to the present invention, the outer diameter may be clearly smaller. Priming caps 270 are very small, or rather, compact and may simply be integrated into adaptive crash structure 110.

Figure 4:
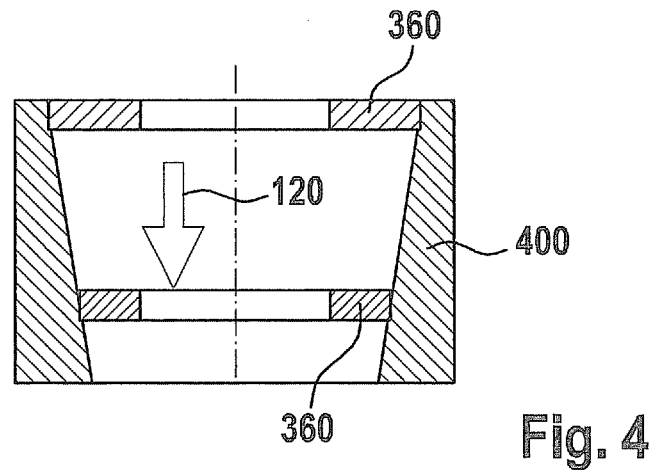
FIG. 4 shows a sectional image of a holding device of the adaptive crash structure of FIGS. 3A and 3B, according to an exemplary embodiment of the present invention.
Figure 5:
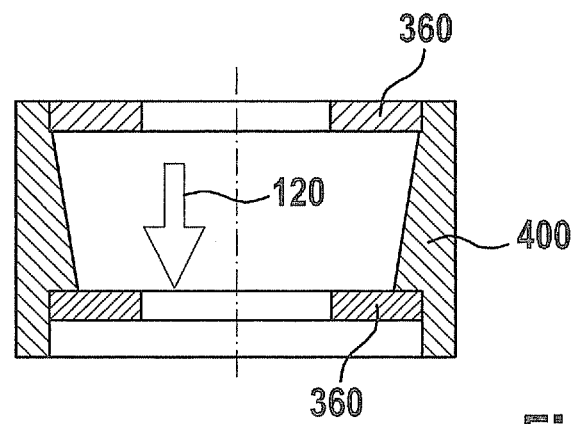
FIG. 5 shows a sectional image of a holding device of the adaptive crash structure of FIGS. 3A and 3B, according to an additional exemplary embodiment of the present invention.

In order to prevent the jumping back of the supporting device or ring 360 after the shooting off into the initial position or first position, ring 360 is fixed by a holding device. The fixing may take place by a conical course of the ring guidance or achieved by a wedge-shaped narrowing, through which the ring is to be pressed. FIGS. 4 and 5 show sectional images of suitable holding devices of the adaptive crash structure of FIGS. 3A and 3B, according to exemplary embodiments of the present invention.

In a simplified representation, FIG. 4 shows a section through a holding device in the form of a first variant of a guidance or a guiding element 400 for ring-shaped supporting device 360. In the exemplary embodiment for guidance 400 shown in FIG. 4, an inner wall forms a funnel that tapers conically in forward motion direction 120. A part of a wall of guiding element 400 may be formed by a wall of the housing of device 110. In the illustration in FIG. 4 at the top, ring 360 is shown in the at-rest position or first position, in which it fulfills a supporting function for the breakable die of the device. In the illustration at the bottom, ring 360 is shown after the ignition of the actuator, in which ring 360 is located in the second position, in which it is no longer supporting the disengageable die. As shown in the illustration in FIG. 4, during the motion along the inner walls of guiding element 400, ring 360 has been compressed and wedged into the wall of guiding element 400, and is now fixed in the second position.

In a simplified illustration, FIG. 5 shows a holding device in the form of a second variant of a guidance or guiding element 400 for ring-shaped supporting device 360. The illustration in FIG. 5 is similar to that in FIG. 4, with the exception that in this case, the funnel-shaped course of the inner wall ends in a latch 410. During the motion from the first into the second position, ring 360 is pressed to go beyond latch 410, and the latter then prevents it from a motion back into the first position, or the at-rest position, and thus fixes it in the second position.

Figure 6:
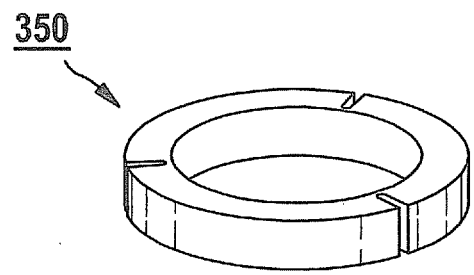
FIG. 6 shows a perspective representation of a disengageable die of the adaptive crash structure of FIGS. 3A and 3B, according to an exemplary embodiment of the present invention.

FIG. 6 shows a perspective representation of disengageable die 350, developed as a ring, of the adaptive crash structure of FIGS. 3A and 3B, according to an exemplary embodiment of the present invention. The exemplary embodiment of disengageable die 350, shown in the illustration, has three predetermined breaking point locations, which subdivide disengageable die 350 into three segments of the same size. If the force acting in a supporting manner on disengageable die 350 is removed, by moving the supporting device from the first into the second position, disengageable die 350 is able to break along the predetermined breaking point locations. The individual segments of disengageable die 350 may then be displaced radially outwards, whereby the inside diameter of disengageable die 350 increases.

Figure 7:
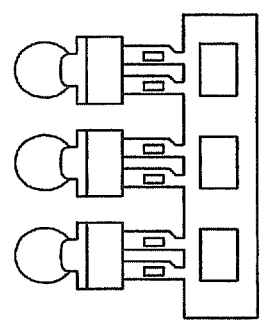
FIG. 7 shows a representation of priming caps of the adaptive crash structure of FIGS. 3A and 3B, according to an exemplary embodiment of the present invention.
Figure 7:
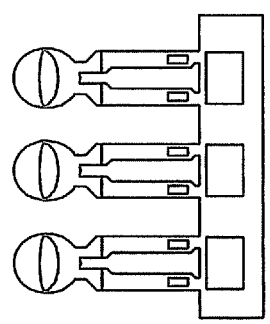
Figure 7:
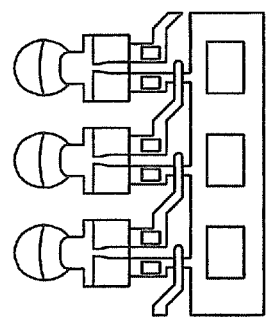
Figure 7:
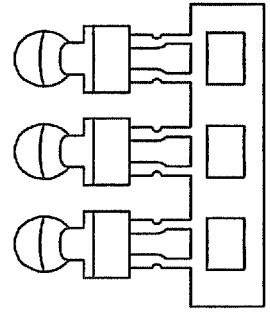

In a view that is accurate as to detail, FIG. 7 shows examples of various types of priming caps that are able to be used in the adaptive crash structure of FIGS. 3A and 3B. For instance, in each case, three priming caps of one type may be situated in an annular fashion and uniformly spaced in the device according to the present invention. The priming caps may be obtained from the manufacturer and installed in the device.

The structures or devices explained with the aid of the figures shown above may also be used for the rear end of the vehicle, even though particularly the use in the front end of the vehicle was observed herein. An adaptive crash structure produced according to the approach introduced in this document is fastened to the vehicle body.

Figure 8:
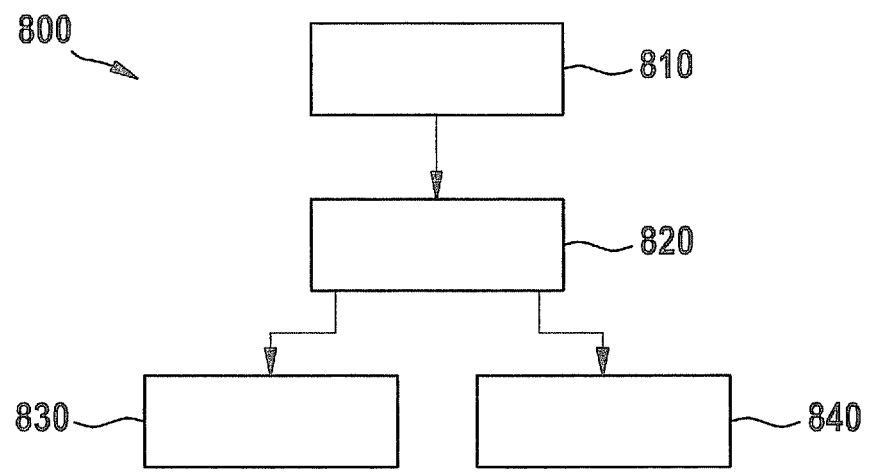
FIG. 8 shows a flow chart of a method for setting a rigidity of an adaptive crash structure, according to en exemplary embodiment of the present invention.

FIG. 8 shows an exemplary embodiment of a flow chart 800 of a method for setting the rigidity of an adaptive crash structure, as is described with the aid of the exemplary embodiment in FIGS. 3A and 3B, for example.

In a first step 810 information is received on a crash energy, in the form of a crash severity signal which, for example, is supplied by an acceleration sensor of a vehicle, in which the abovementioned device is installed. In a subsequent step 820, using a suitable algorithm, for instance, a crash severity associated with a crash energy is compared to a crash severity threshold value, so as to determine, in the case of the exemplary embodiment explained with the aid of FIGS. 3A and 3B, of the device according to the present invention, whether the crash severity ascertained falls below the crash severity threshold value or not. If the comparison in step 820 yields that the crash severity falls below the crash severity threshold value, the method continues with step 830, in which an activation signal for igniting the pyrotechnic actuator is supplied, in order to reduce the rigidity of the device. On the other hand, if the comparison in step 820 yields that the ascertained crash severity does not fall below the crash severity threshold value, the method continues with a step 840, in which the supplying of the activation signal for igniting the pyrotechnic actuator is suppressed. Accordingly, a supporting device remains in the first position, and the device consequently remains set to the high rigidity. In one specific embodiment of method 800, steps 810 and 820 may be carried out in an air bag control unit of the vehicle. Correspondingly, step 830 takes place based on a signal of the air bag control unit.

The exemplary embodiments described and shown in the figures have been selected only in exemplary fashion. Different exemplary embodiments are able to be fully combined with one another, or with regard to individual features. One exemplary embodiment may also be supplemented by features of another exemplary embodiment. Furthermore, method steps according to the present invention may also be carried out repeatedly, as well as in a different sequence than the one described.

What is claimed is:

1. A vehicle-mounted device having an adjustable rigidity for absorbing crash energy, comprising:
   a deformation element;
   a housing accommodating the deformation element, wherein the housing deforms the deformation element when the deformation element is moved in a forward motion direction conditioned by the crash energy;
   a disengageable die arranged in the housing, for accommodating and deforming the deformation element;
   a supporting device arranged in the housing, wherein the supporting device is configured to (i) support, in a first position of the supporting device, the disengageable die against a radial force of the deformation element acting in a transverse direction to the forward motion direction, and (ii) release, in a second position of the supporting device, the disengageable die for a motion for disengagement due to the radial force; and
   a pyrotechnic actuator generating a pressure for moving the supporting device from the first position into the second position, to adjust the rigidity of the vehicle-mounted device.

2. The device as recited in claim 1, wherein the supporting device is configured as a ring having an inner diameter at least equal to an outer circumference of the disengageable die.

3. The device as recited in claim 1, wherein the pyrotechnic actuator has a plurality of equidistantly positioned ignition elements to generate the pressure.

4. The device as recited in claim 1, wherein a wall of the housing positioned behind the supporting device in the forward motion direction has at least one through opening.

5. The device as recited in claim 1, further comprising:
   a guiding element configured to at least one of (i) guide the supporting device between the first position and the second position, and (ii) fix the supporting device in the second position, wherein the guiding element has a sidewall which extends slantwise into the range of motion of the supporting device between the first position and the second position.

6. The device as recited in claim 1, further comprising:
   a guiding element configured to at least one of (i) guide the supporting device between the first position and the second position, and (ii) fix the supporting device in the second position, wherein the guiding element has at least one latch which is positioned between the first position and the second position, and wherein the latch extends into the range of motion of the supporting device.

7. The device as recited in claim 1, further comprising:
   a non-disengageable die for accommodating and deforming the deformation element, wherein the non-disengageable die is positioned ahead of the disengageable die in the housing in the forward motion direction.

8. A method for controlling a vehicle-mounted device having an adjustable rigidity for absorbing crash energy, the vehicle-mounted device including a deformation element, a housing accommodating the deformation element, a disengageable die arranged in the housing, for accommodating and deforming the deformation element, a supporting device arranged in the housing, wherein the supporting device is configured to (i) support, in a first position of the supporting device, the disengageable die against a radial force of the deformation element acting in a transverse direction to the forward motion direction, and (ii) release, in a second position of the supporting device, the disengageable die for a motion for disengagement due to the radial force, and a pyrotechnic actuator, the method comprising:
   receiving a signal containing information about the crash energy;
   comparing a value of the received signal to a predetermined threshold value; and
   providing an activation signal to the pyrotechnic actuator for moving the supporting device from the first position into the second position, in order to adjust the rigidity of the device to a lower level, when the comparison indicates a predetermined ratio between the value of the received signal and the predetermined threshold value.

9. The method as recited in claim 8, wherein the activation signal is provided by an air bag control unit.

10. A non-transitory computer-readable data storage medium storing a computer program having program codes which, when executed on computer, performs a method for controlling a vehicle-mounted device having an adjustable rigidity for absorbing crash energy, the vehicle-mounted device including a deformation element, a housing accommodating the deformation element, a disengageable die arranged in the housing, for accommodating and deforming the deformation element, a supporting device arranged in the housing, wherein the supporting device is configured to (i) support, in a first position of the supporting device, the disengageable die against a radial force of the deformation element acting in a transverse direction to the forward motion direction, and (ii) release, in a second position of the supporting device, the disengageable die for a motion for disengagement due to the radial force, and a pyrotechnic actuator, the method comprising:

receiving a signal containing information about the crash energy;

comparing a value of the received signal to a predetermined threshold value; and providing an activation signal to the pyrotechnic actuator for moving the supporting device from the first position into the second position, in order to adjust the rigidity of the device to a lower level, when the comparison indicates a predetermined ratio between the value of the received signal and the predetermined threshold value.

* * * * *